(12) United States Patent
Lamanna et al.

(10) Patent No.: US 9,129,007 B2
(45) Date of Patent: Sep. 8, 2015

(54) INDEXING AND QUERYING HASH SEQUENCE MATRICES

(75) Inventors: Charles William Lamanna, Bellevue, WA (US); Mauktik H. Gandhi, Redmond, WA (US); Jason Eric Brewer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 12/943,780

(22) Filed: Nov. 10, 2010

(65) Prior Publication Data

US 2012/0117080 A1 May 10, 2012

(51) Int. Cl.
*G06F 17/30* (2006.01)

(52) U.S. Cl.
CPC ................................ *G06F 17/30613* (2013.01)

(58) Field of Classification Search
None
See application file for complete search history.

(56) References Cited

U.S. PATENT DOCUMENTS

| | | | |
|---|---|---|---|
| 4,807,182 A * | 2/1989 | Queen ........................... | 715/210 |
| 7,707,157 B1 | 4/2010 | Shen | |
| 2005/0027723 A1* | 2/2005 | Jones et al. ................... | 707/100 |
| 2007/0050423 A1* | 3/2007 | Whalen et al. ................ | 707/200 |
| 2007/0294235 A1* | 12/2007 | Millett ............................. | 707/3 |
| 2009/0132571 A1 | 5/2009 | Manasse et al. | |
| 2009/0299994 A1 | 12/2009 | Krishnamurthy et al. | |
| 2010/0250896 A1* | 9/2010 | Matze ........................... | 711/216 |

FOREIGN PATENT DOCUMENTS

| | | |
|---|---|---|
| CN | 101079070 A | 11/2007 |
| CN | 101809567 A | 8/2010 |
| CN | 101853260 A | 10/2010 |

OTHER PUBLICATIONS

Timothy C. Hoad and Justin Zobel. 2003. Methods for identifying versioned and plagiarized documents. J. Am. Soc. Inf. Sci. Technol. 54, 3 (Feb. 2003), 203-215.*
Kasprzak et al., Finding Plagiarism by Evaluating Document Similarities. 2009. <http://is.muni.cz/clanky/2009_PAN.pl?lang=en>.*
Ondrej Chum, et al., Near Duplicate Image Detection: min-Hash and tf-idf Weighting, Sep. 14, 2010 (Retrieved Date), (10 pages).
Dell Zhang, et al., Extensions to Self-Taught Hashing: Kernelisation and Supervision, SIGIR'10, Jul. 19-23, 2010, Geneva, Switzerland, (8 pages).

(Continued)

*Primary Examiner* — Syed Hasan
(74) *Attorney, Agent, or Firm* — Timothy Churna; Sade Fashokun; Micky Minhas

(57) ABSTRACT

Embodiments are directed to indexing and querying a sequence of hash values in an indexing matrix. A computer system accesses a document to extract a portion of text from the document. The computer system applies a hashing algorithm to the extracted text. The hash values of the extracted text form a representative sequence of hash values. The computer system inserts each hash value of the sequence of hash values into an indexing matrix, which is configured to store multiple different hash value sequences. The computer system also queries the indexing matrix to determine how similar the plurality of hash value sequences are to the selected hash value sequence based on how many hash values of the selected hash value sequence overlap with the hash values of the plurality of stored hash value sequences.

20 Claims, 4 Drawing Sheets

(56) References Cited

OTHER PUBLICATIONS

Anindya Sarkar et al., Efficient and Robust Detection of Duplicate Videos in a Large Database, Sep. 14, 2010 (Retrieved Date), (30 pages).
Gurmeet Singh Manku et al., Detecting Near-Duplicates for Web Crawling, WWW 2007 / Track: Data Mining, May 8-12, 2007, Banff, Alberta, Canada, (pp. 141-149).
Ping Li et al., b-Bit Minwise Hashing for Estimating Three-Way Similarities, Dec. 2009, (22 pages).
Polina Zilberman et al., Analyzing Group Communication for Preventing Data Leakage via Email, Feb. 5, 2008, (10 pages).
Lei Yang et al., Content Based Image Hashing Using Companding and Gray Code, Sep. 14, 2010 (Retrieved Date), (10 pages).
Feifei Li et al., Authenticated Index Structures for Aggregation Queries, Sep. 14, 2010 (Retrieved Date), (30 pages).
"Office Action and Search Report Issued in Chinese Patent Application No. 201110372972.X", Mailed Date: Dec. 17, 2013, 13 Pages.
"Second Office Action and Search Report Issued in Chinese Patent Application No. 201110372972.X", Mailed Date: Aug. 28, 2014, 21 Pages.
"Third Office Action Received for Chinese Patent Application No. 201110372972.X", Mailed Date: Dec. 22, 2014, 12 Pages.

* cited by examiner

INDEXING AND QUERYING HASH SEQUENCE MATRICES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to compare the text of documents, emails or other strings of characters. In such cases, documents may be divided up into different word units which are converted to hash values. These hash values are then compared sequentially with hash values from other documents. Typically, such document comparing programs cannot performantly identify documents as being similar or the same unless the compared hash sequences are very similar (e.g. 95%+ similar).

BRIEF SUMMARY

Embodiments described herein are directed to indexing and querying a sequence of hash values in an indexing matrix. In one embodiment, a computer system accesses a document to extract a portion of text from the document. The computer system applies a hashing algorithm to the extracted text. The hash values of the extracted text form a representative sequence of hash values. The computer system also inserts each hash value of the sequence of hash values into an indexing matrix, which is configured to store multiple different hash value sequences.

In another embodiment, a computer system accesses an indexing matrix upon which multiple hash value sequences are stored. The hash value sequences represent word constructs from various documents. The computer system accesses a selected hash value sequence corresponding to a selected document upon which a query is to be based. The computer system determines where hash values of the selected hash value sequence overlap with the hash values of the plurality of stored hash value sequences. The computer system also queries the indexing matrix to determine how similar the plurality of hash value sequences are to the selected hash value sequence based on how many hash values of the selected hash value sequence overlap with the hash values of the stored hash value sequences.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
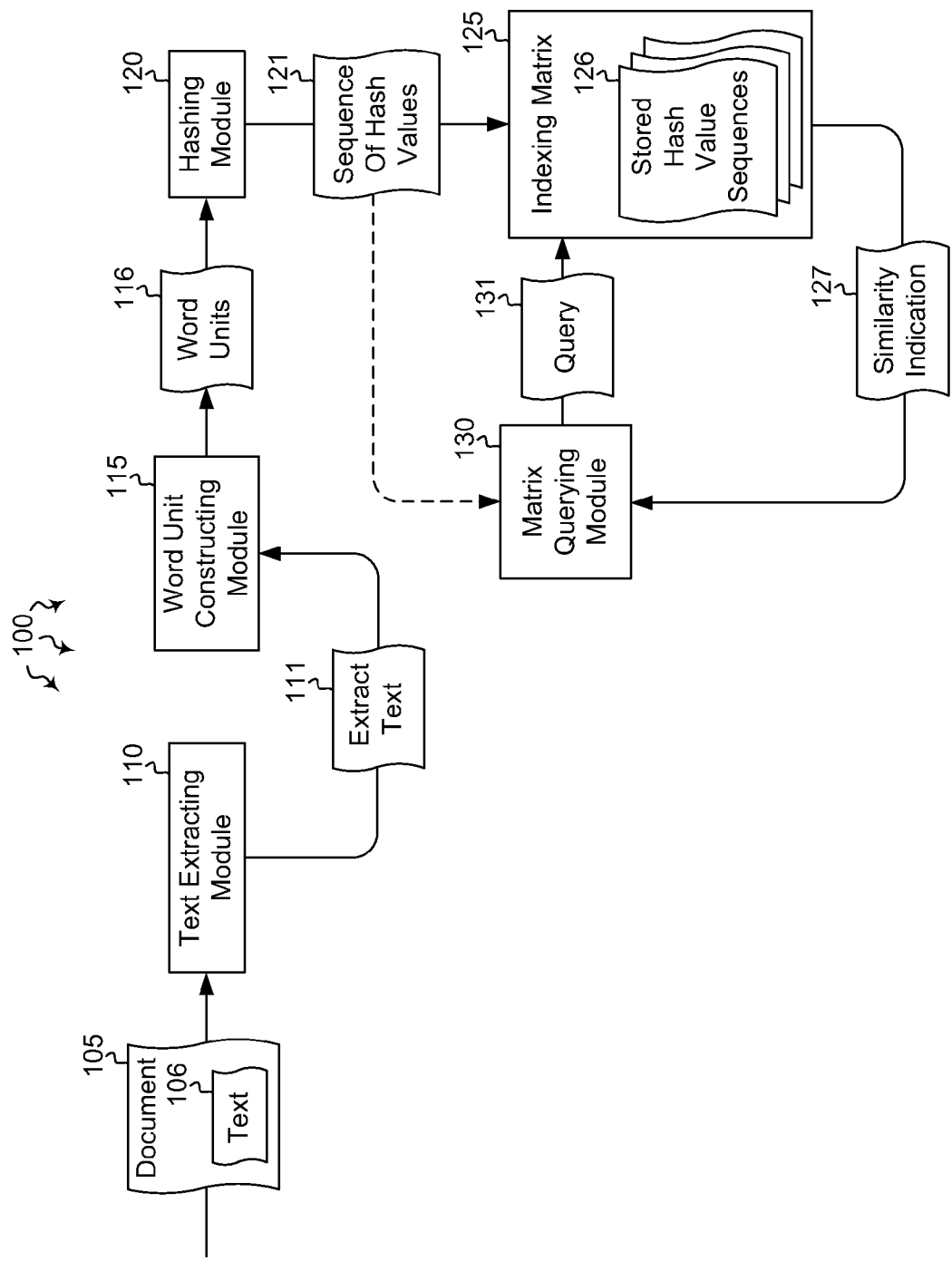
FIG. 1 illustrates a computer architecture in which embodiments of the present invention may operate including indexing and querying a sequence of hash values in an indexing matrix.

Embodiments described herein are directed to indexing and querying a sequence of hash values in an indexing matrix. In one embodiment, a computer system accesses a document to extract a portion of text from the document. The computer system applies a hashing algorithm to the extracted text. The hash values of the extracted text form a representative sequence of hash values. The computer system also inserts each hash value of the sequence of hash values into an indexing matrix, which is configured to store multiple different hash value sequences.

In another embodiment, a computer system accesses an indexing matrix upon which multiple hash value sequences are stored. The hash value sequences represent word constructs from various documents. The computer system accesses a selected hash value sequence corresponding to a selected document upon which a query is to be based. The computer system determines where hash values of the selected hash value sequence overlap with the hash values of the plurality of stored hash value sequences. The computer system also queries the indexing matrix to determine how similar the plurality of hash value sequences are to the selected hash value sequence based on how many hash values of the selected hash value sequence overlap with the hash values of the stored hash value sequences.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, distributed systems (e.g. cloud computing, cloud services and the like), mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes text extracting module 110. The text extracting module may be configured to extract text 106 from document 105. The text may be in any type of format and may include any number of characters and/or character types. The document may be any type of data structure that stores text or sequences of characters. The text extracted (111) by the text extracting module may be sent to word unit constructing module 115. The word unit constructing module may be configured to construct word units 116 from the extracted text. The word units may be textual words, phrases or other character sequences. The words may be complete words, partial words or single letters or numbers. The word units may be sent singly or as groups to hashing module 120.

Hashing module 120 may be configured to compute hash values for each of the word units received from the word unit constructing module. The hashing module may use any type of hashing algorithm to compute the hash values. In some cases, the hashing module computes hash values for each word unit as it is received. In this manner, hash sequences 121 are formed. The hash sequences may represent a series of words such as a phrase or sentence. In cases where an entire document is converted into word units and subsequently to hash values, the hash value sequence 121 may represent the entire document. The hash value sequence may be stored in indexing matrix 125, and may be queried against by matrix querying module 130.

For instance, in cases where a user wants to determine how similar one document is to another document, both documents may be converted to word units and to hash value sequences, and then compared based on the hash value sequences. Matrix querying module 130 may send a query 131 to indexing matrix 125 to determine similarity between a selected document and a stored document (e.g. a stored hash value sequence 126). The indexing matrix (or another computing module) may determine the differences between the selected document and the stored document and may issue a similarity indication 127 indicating how similar the two documents are. These concepts will be explained in greater detail below with regard to methods 200 and 300 of FIGS. 2 and 3, respectively.

In some cases, indexing and querying similar hash sequences may be used to identify duplicate, near-duplicate, or template-based documents. In such cases, a hash value sequence may be used as a "fingerprint" for a particular document. This fingerprint may be used to rapidly compute similarity between documents. The following are non-limiting use examples: detection and filtering of email messages (e.g. anti-spam or custom mail routing rules), search application implementation (including in stand-alone search engines as well as in embedded search features in products), data mining application implementation, and data leakage prevention (DLP) of sensitive information. Many other uses are possible and the above examples are not limiting on the uses for the claimed invention.

As mentioned above, hash value sequences may be stored in a dense matrix. This matrix may index the hash value sequences which may be queried to determine duplicate, near-duplicate or template-based documents. In some cases, security may be improved by using a representative set of values for each hash in the large sequence. For instance, instead of including the entire hash value for each word unit, only a portion of the hash value may be stored in the indexing matrix 125. The b-bit Minwise Hashing algorithm can provide a secure and accurate fingerprint while only storing 8-12 of the hash's values. Performance may be improved by filtering on certain heuristics within a particular cell of the index matrix.

A fixed-size representation of a particular document (e.g. 105) may be achieved by using a sequence of hash values 121 as derived by the hashing module 120. This sequence of values 121 may then be used to determine if two documents are duplicate, near-duplicate or template-derived. For example, if the hash sequences for Document 1 and Document 2 are 80% similar (i.e. fingerprint hashes are the same for at least 80% of the time), then it may be determined that the two files are near-duplicate. In some cases, Document 1 may be compared with a very large number of documents (e.g. 100,000+, or 1 MM+). In such cases, documents are indexed and queried based on a set of a hash value sequences.

In some embodiments, indexing a large hash value sequence (i.e. a document fingerprint) may include the following: first, construct an indexing matrix of size $1024*2^{12}$ (this size is variable and customizable). Each column may correspond to a 12-bit hash so that 1024 hashes comprise the fingerprint. Each row may correspond to the value of that 12-bit hash. The hash may be the 12 least significant bits of a modified 64-bit hash (e.g. Md5 derived). The 12-bit hash loses or filters information from the MD5, thereby improving irreversibility. This allows indices to be created for hash sequences (fingerprints) that represent potentially sensitive information. The indexing matrix may then be populated with the various fingerprints that are to be indexed.

In some embodiments, querying the indexing matrix may include the following: consider an unknown fingerprint FpQuery and create a "fingerprint match counting vector" called FpMatchVector with size equal to the number of indexed fingerprints. Each value in FpMatchVector may correspond with an indexed fingerprint. In some cases, all values in this vector may be initialized to zero. For each hash $Fp(Squery)_i$ for the fingerprint FpQuery, where ($1 \leq i \leq 1024$): jump to the cell in the matrix according to (row, column)=Fp $(S\_query)_i$, i). For all indexed fingerprints in this cell, if certain heuristics do not match for the hash sequence (e.g. if associated metadata like file size is too large or too small), skip the following step (otherwise, perform it): increment the count in FpMatchVector that corresponds with those indexed fingerprints (e.g. if $Fp_7$ is in that cell, call FpMatchVector [7]++). Then, iterate through FpMatchVector and identify all fingerprints that have a similarity above a preset threshold (e.g. 80% similarity). This may be done by doing the count for a given position in FpMatchVector and setting the size of the sequence of hash values (e.g. 1024 in the above examples). Additionally, the similarity may be used to compute a containment coefficient, which allows for the detection of documents based on a particular template.

Figure 2:
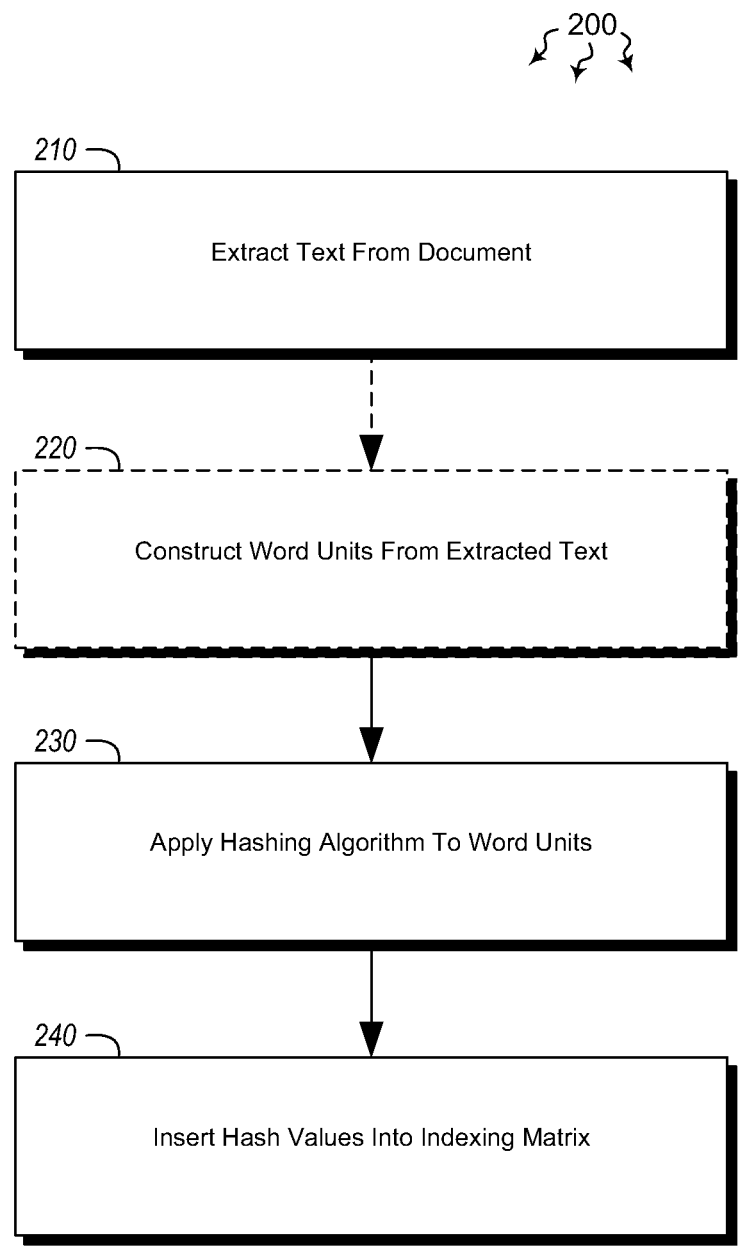
FIG. 2 illustrates a flowchart of an example method for indexing a sequence of hash values in an indexing matrix.
Figure 3:
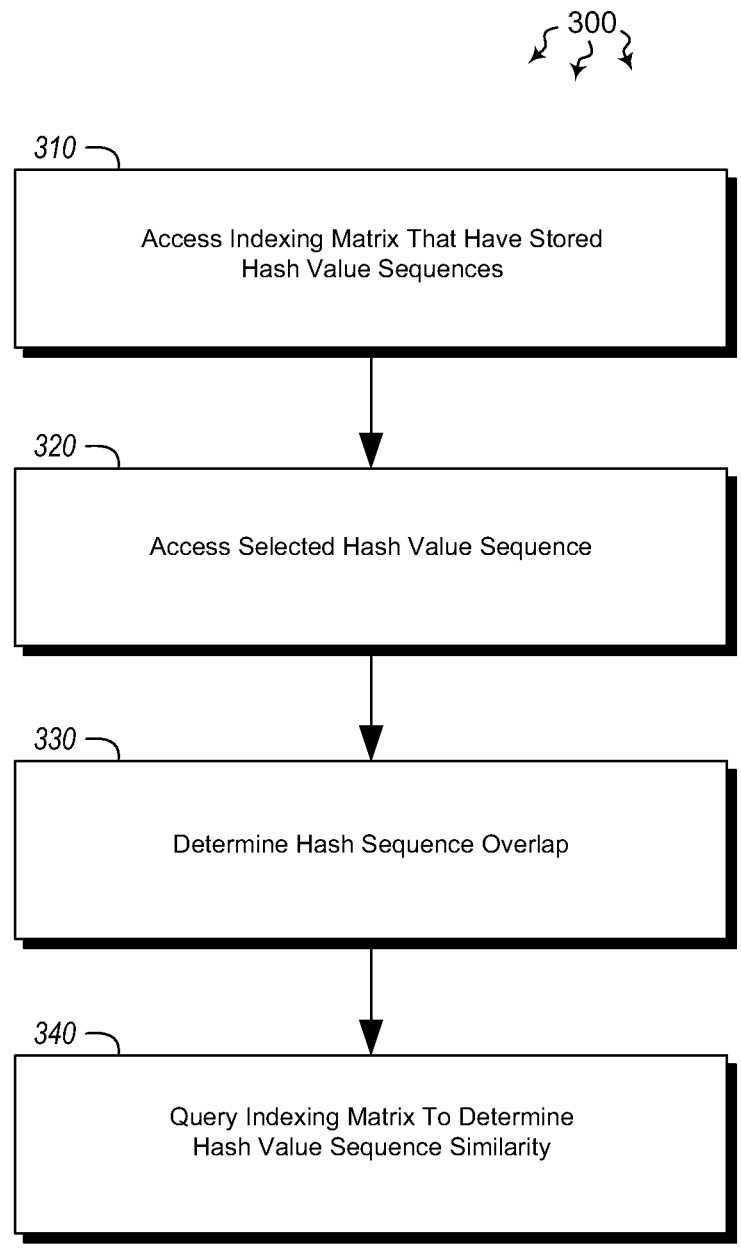
FIG. 3 illustrates a flowchart of an example method for querying an indexing matrix to determine hash sequence similarities.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for indexing a sequence of hash values in an indexing matrix. The method 200 will now be described with frequent reference to the components and data of environments 100 and 400 of FIGS. 1 and 4, respectively.

Method 200 includes an act of accessing a document to extract at least a portion of text from the document (act 210). For example, text extracting module 110 may access document 105 to extract text 106 from the document. The text extracting module may access any number of documents simultaneously (in parallel) or sequentially. Each document may be from a different source or the same source. For instance, the documents may be received from a user or group of users, from a software application or from another entity. The text extracted by module 110 may include any sequence or block of letters, numbers and/or other symbols.

Method 200 includes an optional act of constructing one or more word units from the extracted portion of text (act 220). For example, word unit constructing module 115 may construct one or more word units 116 from extracted text 111. In some cases, the constructed word units may comprise word pairs. Thus, if the extracted text were to read "Patent Application A1. This is a patent.", the constructed word pairs would include the following: "Patent Application", "Application A1.", "A1. This", "This is", "is a", "a patent." Other, more complex (or simpler) word units may be used in addition to those listed above. The above example merely illustrates one way of constructing word units, and should not be read as limiting how word units may be formed. Word units may comprise substantially any number of words, letters, numbers or other symbols. The construction of word units may be changed or customized as needed.

In some cases, hash sequences may be generated without constructing any word units. For instance, hashing algorithms may create hash value sequences that correspond to a document by using any of a variety of hashing techniques that do not involve the construction of word pairs. Thus, the construction of word pairs is one example of a way to convert a document into something a hashing algorithm can use to create a hash value sequence.

Method 200 further includes an act of applying a hashing algorithm to each of the constructed word units, wherein the hash values of the constructed word units form a representative sequence of hash values (act 230). For example, hashing module 120 may apply a hashing algorithm to each of the constructed word units 116. The hash values of the constructed units may be placed in sequence, according to the order in which the word units were received. These hash value sequences thus represent the extracted text of the document 105. Thus, continuing the above example, if these word pairs were received ("Patent Application", "Application A1.", "A1. This", "This is", "is a", "a patent"), they would be converted to hash values as follows: "Patent Application" would be converted to hash.1, "Application A1." would be converted to hash.2, and so on until all the word units had been converted to hash values.

In some embodiments, the hashing algorithm applied by the hashing module 120 may convert the constructed word units 116 to a fixed size sequence of hash numbers (e.g. 1024 hash numbers). The fixed size may be changed for different uses. In some cases, the size of the sequence of hash numbers may vary based on different factors such as processing power or total allotted processing time. The word construct hash values may be inserted in the columns of an indexing matrix according the hash value's position in the sequence of hash values. It should be noted that, at least in some cases, hash value sequences corresponding to a selected document may be compared hash values of other sequences in the matrix without actually inserting the hash values of the selected document into the matrix.

Figure 4:
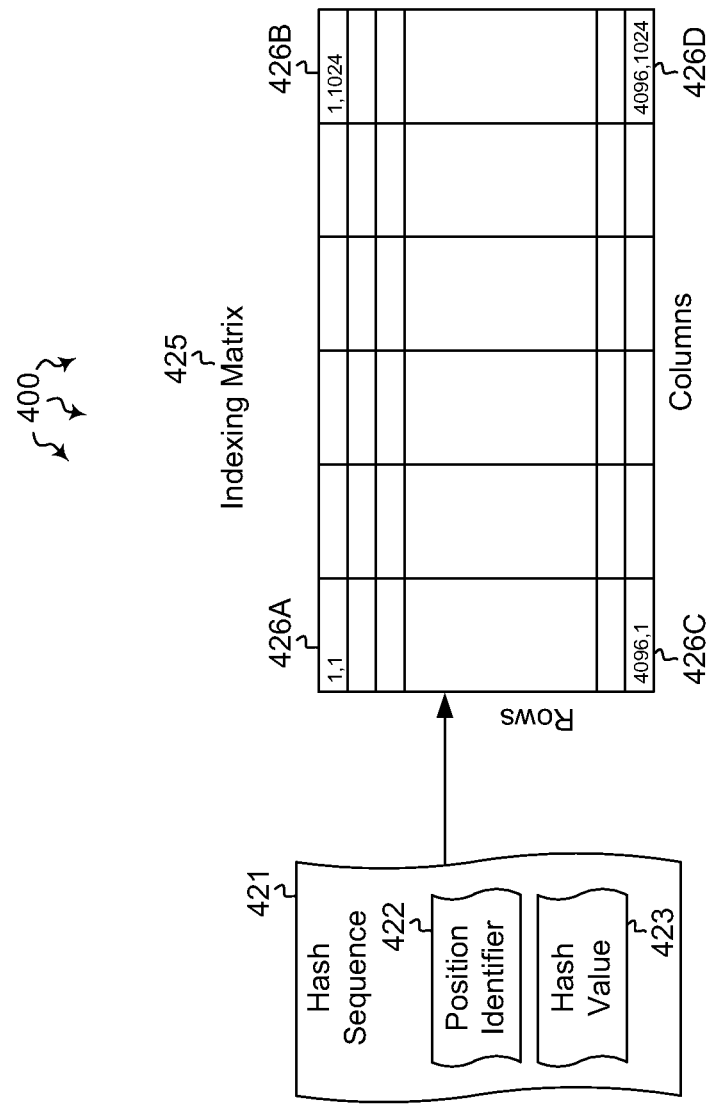
FIG. 4 illustrates an embodiment of the present invention in which a hash value sequence is indexed in an indexing matrix.

Thus, as shown in FIG. 4, hash sequence 421 may be inserted into indexing matrix 425 according to the hash sequence's position identifier 422. The position identifier indicates where the word unit appeared in the text. For instance, continuing the above example, "Patent Application" which was converted to hash.1 would appear at row 1, column 1 (i.e. in position 426A), while "Application A1." which was converted to hash.2 would be inserted into row 1, column 2, and so on until the entire sequence of hash values had been inserted into the matrix. In some cases, indexing matrix 425 may be 1024 columns wide by 4096 rows long. Thus, in cell 426A, position 1, 1 (row 1, column 1) is shown. Correspondingly, cell 426B shows position 1, 1024 (row 1, column 1024) while cell 426C shows position 4096, 1 (row 4096, column 1) and cell 426D shows position 4096, 1024 (row 4096, column 1024).

In some cases, the hash sequence 421 may be inserted in the rows of the indexing matrix according to the hash value's actual value (423). Thus, each hash value of the hash value sequence may be inserted into the matrix based on its value. As mentioned above, hash values may be truncated such that only a portion of the hash value is stored in the indexing matrix. The stored portion may be variable for different clients and may be changed depending on processing capabilities and security concerns. As such, the actual portion stored in the matrix may vary depending on implementation.

Returning to FIG. 2, method 200 includes an act of inserting each hash value of the sequence of hash values into an indexing matrix, wherein the matrix is configured to store a plurality of different hash value sequences (act 240). For example, as mentioned above, the sequence of hash values 421 may be inserted into indexing matrix 425, which stores multiple different hash sequences (fingerprints of different documents). In some cases, the sequence of hash values may be discarded upon insertion into the indexing matrix. Multiple different sequences of hash values may be inserted into the indexing matrix.

Once populated with different document fingerprints, the indexing matrix may be queried to determine how similar the stored hash value sequences are to a selected hash value sequence upon which the query is based. Thus, in other words, a user may select a document which is to be compared against a plurality of different documents. The querying may include inserting the selected hash value sequence (for the document the user wishes to compare (i.e. the document upon which the query is based)) in the indexing matrix to determine where hash values of the selected hash value sequence overlap with the hash values of the other stored hash value sequences. When hash values of the user-selected document overlap with hash values of other stored documents, those overlapping areas indicate a match. Each overlapping hash indicates a likelihood of having the same (or very similar) word unit. The more hashes that overlap, the higher the user-selected document compares to another document.

Thus, the selected hash value sequence (of the user-selected document) may be indicated as having a certain degree of similarity to the other stored hash value sequences, depending on how many hash values of the selected hash value sequence overlap with the hash values of the other stored hash value sequences. In some cases, heuristics may be used to filter hash value sequences that are known not to overlap with the hash value sequence of the selected hash value sequence. In this manner, hash sequences (fingerprints) of documents known not to match will not be compared, thus saving processing power.

Turning on to FIG. 3, FIG. 3 illustrates a flowchart of a method 300 for querying an indexing matrix to determine hash sequence similarities. The method 300 will now be described with frequent reference to the components and data of environment 100.

Method 300 includes an act of accessing an indexing matrix whereon a plurality of hash value sequences are stored, the hash value sequences representing word constructs from one or more documents (act 310). For example, indexing matrix 125 may be accessed which stores hash value sequences 126. The stored hash value sequences correspond to word constructs that form different documents. The word constructs may be taken from all types and formats of documents, including documents with various types of media embedded or otherwise included in the document. Thus, as used herein, documents may include word processing documents, spreadsheet documents, presentation documents, web pages, proprietary application-produced documents and others.

Method 300 includes an act of accessing a selected hash value sequence corresponding to a selected document upon which a query is to be based (act 320). For example, a user or other entity (such as a software application) may select a query document which is to be compared to other documents to determine how similar it is to other documents. The query document 131 may be sent by matrix querying module 130 to indexing matrix 125.

Method 300 includes an optional act of inserting the selected hash value sequence into the indexing matrix to determine where hash values of the selected hash value sequence overlap with the hash values of the plurality of stored hash value sequences (act 330). For example, indexing matrix 125 may insert the hash value sequence of the query document into the indexing matrix to determine where hash values of the query hash value sequence overlap with the hash values of the plurality of stored hash value sequences 126. The word construct hash values may be inserted in the columns of the indexing matrix according the hash value's position in the sequence of hash values. Moreover, the word construct hash values may be inserted in the rows of the indexing matrix according to the hash value's actual value. As noted above, however, the indexing matrix may be queried directly to determine whether a source document matches any of the stored documents in the indexing matrix. In such cases, similarity between documents may be determined without inserting the hash value sequences of the selected document into the indexing matrix.

As mentioned above, wherever the query sequence overlaps with existing hash value sequences in the matrix (i.e. one cell shares the same hash value as the query document at that cell), those cells are said to match and a match indicator is incremented up by one cell. The more cells that match, the more the query document is similar to that document. Because the total number of hash values are known (i.e. in some cases all documents are converted to 1024×4096 size), the indexing matrix can output a similarity indication which indicates how similar the query document is to each of the other documents stored in the matrix in percentage form (e.g. "X %" similar).

Method 300 includes an act of querying the indexing matrix to determine how similar the plurality of hash value sequences are to the selected hash value sequence based on how many hash values of the selected hash value sequence overlap with the hash values of the plurality of stored hash value sequences (act 340). For example, matrix querying module 130 may query indexing matrix 125 to determine how similar the plurality of hash value sequences 126 are to the selected hash value sequence based on how many hash values of the selected hash value sequence overlap with the hash values of the plurality of stored hash value sequences. The query document may thus be indicated as having a certain degree of similarity to the other stored hash value sequences, perhaps in percentage form.

In some cases, to improve output, multiple hash values may be compared simultaneously. That is, multiple source documents may be compared to the stored hash value sequences at the same time. Still further, heuristics may be used to filter hash value sequences that are known not to overlap with the hash value sequence of the selected hash value sequence (or selected group of hash value sequences).

Accordingly, methods, systems and computer program products are provided which index and store a sequence of hash values in an indexing matrix. Moreover, methods, systems and computer program products are provided which query an indexing matrix to determine hash sequence similarities. The determined hash sequence similarities may be output as a certain percent similar to a source document.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for indexing a sequence of hash values in an indexing matrix, the method comprising:
   an act of accessing a document to extract at least a portion of text from the document;
   an act of applying a hashing algorithm to a plurality of constructed word units, wherein hash values of the constructed word units form a representative sequence of hash values, the size of the sequence of hash values being variable based on one or more factors that control the size of the sequence of hash values;
   an act of inserting at least a portion of each hash value of the sequence of hash values into an indexing matrix in accordance with position identifiers that indicate where each word unit appears in the text, wherein the matrix is configured to store at least one hash value portion and one position identifier at each cell in the matrix, the position identifiers allowing each sequence of hash values to be stored non-sequentially within the matrix, the size of each hash value being variable, the variable-size hash values comprising a filtered selection of bits selected from each hash value, the filtered selection of bits being configured to prevent the identification of information represented by the hash value portions; and
   an act of determining which matrix cells include overlapping hash values, the number of overlapping hash values indicating how related the portion of text is to one or more other portions of text.

2. The method of claim 1, further comprising an act of constructing one or more word units from the extracted portion of text, wherein the hashing algorithm converts the constructed word units to a fixed-size sequence of hash numbers.

3. The method of claim 2, wherein the size of the fixed-size sequence of hash numbers is determined based on one or more applied factors selected from the group consisting of processing power and total allotted processing time.

4. The method of claim 1, wherein the word construct hash values are inserted in one or more columns of the indexing matrix according the hash value's position in the sequence of hash values.

5. The method of claim 1, wherein the word construct hash values are inserted in one or more rows of the indexing matrix according to the hash value's actual value.

6. The method of claim 1, wherein the sequence of hash values is discarded from memory, upon a new hash value being inserted into the indexing matrix.

7. The method of claim 1, further comprising an act of inserting a plurality of sequences of hash values representing other, different documents into the indexing matrix.

8. The method of claim 7, further comprising an act of querying the indexing matrix to determine how similar the plurality of hash value sequences are to the hash value sequences upon which the query is based.

9. The method of claim 8, wherein querying comprises:
   inserting the selected hash value sequence upon which the query is based in the indexing matrix; and
   determining where hash values of the selected hash value sequence overlap with the hash values of the other stored hash value sequences.

10. The method of claim 9, wherein the selected hash value sequence is indicated as having a certain degree of similarity to the other stored hash value sequences, depending on how many hash values of the selected hash value sequence overlap with the hash values of the other stored hash value sequences.

11. The method of claim 10, wherein heuristics are used to filter hash value sequences that are known not to overlap with the hash value sequence of the selected hash value sequence.

12. The method of claim 10, wherein the similarity between two documents is used to determine whether the documents are based on the same template.

13. The method of claim 12, wherein the indexing matrix identifies one or more documents for subsequent processing.

14. A computer program product for implementing a method for querying an indexing matrix to determine hash sequence similarities, the computer program product comprising one or more computer-readable storage media having stored thereon computer-executable instructions that, when executed by one or more processors of the computing system, cause the computing system to perform the method, the method comprising:
   an act of accessing an indexing matrix whereon a plurality of hash value sequences are stored, the hash value sequences representing word constructs from one or more documents, the size of the sequence of hash values being variable based on one or more factors that control the size of the sequence of hash values;
   an act of accessing a selected hash value sequence corresponding to a selected document upon which a query is to be based, the selected hash value sequence being inserted as individual portions of hash values into cells of the indexing matrix in accordance with position identifiers that indicate where each word unit appears in the text, wherein the position identifiers allow each sequence of hash values to be stored non-sequentially within the matrix, the size of each hash value being variable, the variable-size hash values comprising a filtered selection of bits selected from each hash value, the filtered selection of bits being configured to prevent the identification of information represented by the hash value portions;

an act of determining which matrix cells include hash values of the selected hash value sequence that overlap with the hash values of the plurality of stored hash value sequences; and an act of querying the indexing matrix to determine how similar the plurality of hash value sequences are to the selected hash value sequence based on how many hash values of the selected hash value sequence overlap with the hash values of the plurality of stored hash value sequences.

15. The computer program product of claim 14, wherein the selected hash value sequence is indicated as having a certain degree of similarity to the other stored hash value sequences, depending on how many hash values of the selected hash value sequence overlap with the hash values of the other stored hash value sequences.

16. The computer program product of claim 14, wherein heuristics are used to filter hash value sequences that are known not to overlap with the hash value sequence of the selected hash value sequence.

17. The computer program product of claim 14, wherein multiple hash value sequences are compared simultaneously.

18. The computer program product of claim 14, wherein only a portion of the hash value for each word construct is stored in the indexing matrix.

19. The computer program product of claim 14, wherein the word construct hash values are inserted in one or more columns of the indexing matrix according the hash value's position in the sequence of hash values, and wherein the word construct hash values are inserted in one or more rows of the indexing matrix according to the hash value's actual value.

20. A computer system comprising the following:
one or more processors;
system memory;
at least one computer-readable storage device having stored thereon computer-executable instructions that, when executed by the one or more processors, causes the computing system to perform a method for indexing and querying a sequence of hash values in an indexing matrix, the method comprising the following:

an act of accessing a document to extract at least a portion of text from the document;

an act of constructing a plurality of word units from the extracted portion of text;

an act of applying a hashing algorithm to each of the constructed word units, wherein hash values of the constructed word units form a representative sequence of hash values, the size of the sequence of hash values being variable based on one or more factors that control the size of the sequence of hash values;

an act of inserting at least a portion of each hash value of the sequence of hash values into an indexing matrix in accordance with position identifiers that indicate where each word unit appears in the text, wherein the matrix is configured to store at least one hash value portion and one position identifier at each cell in the matrix, the position identifiers allowing each sequence of hash values to be stored non-sequentially within the matrix, the size of each hash value being variable, the variable-size hash values comprising a filtered selection of bits selected from each hash value, the filtered selection of bits being configured to prevent the identification of information represented by the hash value portions; and an act of querying the indexing matrix to determine how similar the plurality of hash value sequences are to the inserted hash value sequence based on how many hash values of the inserted hash value sequence overlap with the hash values of the plurality of stored hash value sequences.

* * * * *